H. BOUSHEAR.
WATER GAGE.
APPLICATION FILED OCT. 26, 1909.
969,454.
Patented Sept. 6, 1910.
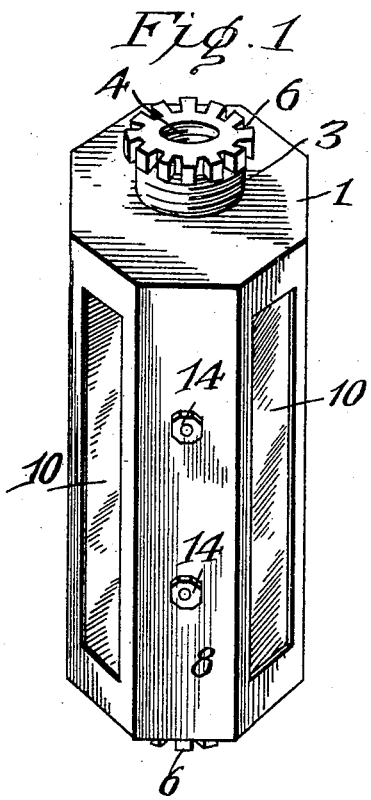
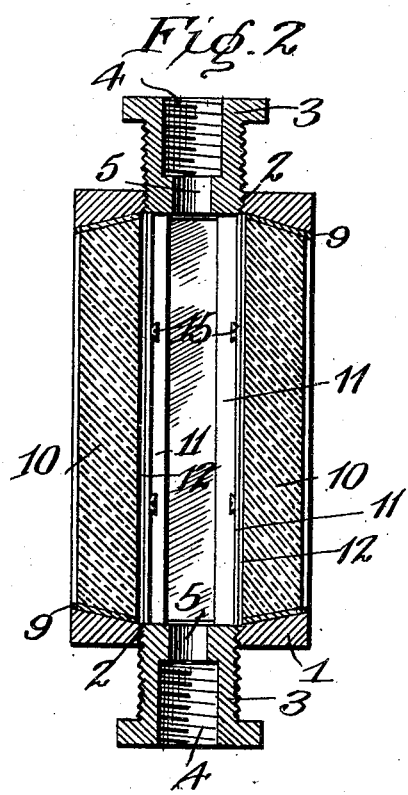
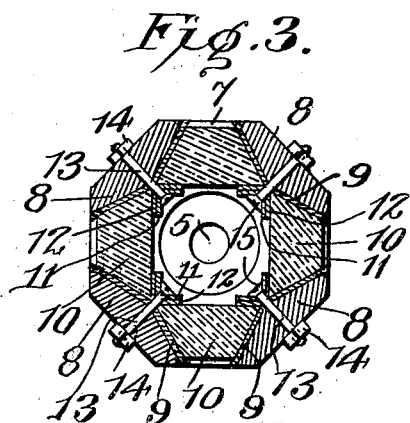
Henry Boushear, Inventor
Witnesses

UNITED STATES PATENT OFFICE.

HENRY BOUSHEAR, OF FORT WILLIAM, ONTARIO, CANADA.

WATER-GAGE.

969,454.  Specification of Letters Patent.  Patented Sept. 6, 1910.

Application filed October 26, 1909. Serial No. 524,633.

*To all whom it may concern:*

Be it known that I, HENRY BOUSHEAR, a subject of the King of England, and resident of Fort William P. O., in the Province of Ontario, in the Dominion of Canada, have invented certain new and useful Improvements in Water-Gages, of which the following is a specification, reference being had therein to the accompanying drawing.

This invention relates to water glasses, and has for its object the production of a glass, which will allow its contents to be viewed from a number of sides.

Another object of this invention is the production of a glass, the parts of which can be readily detached in case any of the same should become broken or fractured, and be replaced by new or unbroken parts.

With these and other objects in view this invention consists of certain novel constructions, combinations and arrangements of parts as will be hereinafter fully described and claimed.

In the drawings: Figure 1 is a perspective view of the gage glass. Fig. 2 is a vertical section of the same taken through the glass plates. Fig. 3 is a transverse section of the glass.

Referring to the drawings by numerals, 1 designates the housing or casing, which is provided upon each end with a threaded aperture 2. In the apertures 2 are threaded plug devices 3, which plug devices are provided with threaded sockets 4 adapted to be threaded upon the suitable connecting pipes to the steam boiler. The plug devices 3 are also provided with apertures 5, which communicate with the interior of the gage glass and allow the liquid to flow therein. The plug devices 3 are provided upon the top thereof with a plurality of tooth portions 6, which are adapted to facilitate the rotation of the plug devices 3 and the connecting of the same to the casing 1, and also to the communicating pipe of the steam boiler. The tooth portions 6 are adapted to be engaged by a peculiarly constructed wrench, so as to allow the same to be easily operated.

The casing 1 is provided with a plurality of side openings 7 and a plurality of side walls 8. The side walls 8 taper upon their inner sides which latter are covered with packing 9. The openings 7 in the walls of the casing or housing 1 are closed by means of glass plates 10 for allowing the contents within the glass to be easily viewed from the outside thereof. The glass plates 10 are firmly held within the openings 7 by means of clamp devices 11, which are substantially right angular in cross section. The clamp devices 11 are lined upon their glass-engaging surfaces with packing 12, and each clamp device 11 is firmly held in engagement with the glass plates 10 by means of a bolt-member 13, which passes through the side walls 8 and said bolt has a nut 14 threaded upon the outer end thereof, and, it will, therefore, be obvious that by tightening the nut 14 the clamp device 11 will be brought into binding engagement with the glass plates 10, thereby firmly clamping the same within the openings 7. The bolts 13 are provided with screw heads 15, and by having such a head formed upon the bolt, it will be obvious that the bolt will readily engage the clamp device.

From the foregoing description, it will be readily obvious that I have provided efficient means for firmly holding the glass plates 10 within the casing or housing 1 and that the same will be less likely to break, for the reason that the glass plates are at all times engaged by the packing both upon the side walls 8 and also upon the clamp devices 11.

What I claim is:—

1. In an indicator of the class described a housing provided with a plurality of side openings, said casing lined with packing, plates positioned within said casing and adapted to close said side openings, clamp devices positioned within said housing and engaging said glass plates for holding the same firmly within said openings, and bolts passing through said clamp devices and housing for firmly holding the clamp devices in engagement with said glass plates.

2. A device of the class described comprising a housing, said housing provided with a plurality of side openings, glass plates closing said openings and allowing the interior of said housing to be viewed from the outside, clamp devices substantially right angular in cross section engaging said glass plates, bolts passing through said clamp devices and housing and provided with threaded outer ends extending outside of said housing, and a nut threaded upon the threaded end of each of said bolts and adapted to firmly clamp the clamp devices in engagement with the glass plates.

In testimony whereof I hereunto affix my signature in presence of two witnesses.

HENRY BOUSHEAR.

Witnesses:
WILLIS FROGGATT,
JOHN WILLIAM KELLETT.